July 14, 1953  C. A. LEVIN  2,645,174
DRUM STOP MECHANISM FOR ROTARY DUPLICATING MACHINES
Filed Aug. 4, 1949  11 Sheets-Sheet 1

Fig.1.

Inventor:
Carl A. Levin
By Zahl & Dritzbaugh
Attorneys

July 14, 1953  C. A. LEVIN  2,645,174
DRUM STOP MECHANISM FOR ROTARY DUPLICATING MACHINES
Filed Aug. 4, 1949  11 Sheets-Sheet 6

Fig. 7.

Inventor:
Carl A. Levin
By Zabel & Gritzbaugh
Attorneys

July 14, 1953

C. A. LEVIN 2,645,174

DRUM STOP MECHANISM FOR ROTARY DUPLICATING MACHINES

Filed Aug. 4, 1949

Inventor:
Carl A. Levin
By Zabel & Gritzbaugh
Attorneys

July 14, 1953 C. A. LEVIN 2,645,174
DRUM STOP MECHANISM FOR ROTARY DUPLICATING MACHINES
Filed Aug. 4, 1949 11 Sheets-Sheet 8

July 14, 1953   C. A. LEVIN   2,645,174
DRUM STOP MECHANISM FOR ROTARY DUPLICATING MACHINES
Filed Aug. 4, 1949   11 Sheets-Sheet 9

Inventor:
Carl A. Levin
By Zahl & Gritzbaugh
Attorneys

July 14, 1953

C. A. LEVIN

2,645,174

DRUM STOP MECHANISM FOR ROTARY DUPLICATING MACHINES

Filed Aug. 4, 1949

Inventor:
Carl A. Levin
By Zahl & Gritzbaugh
Attorneys

July 14, 1953

C. A. LEVIN 2,645,174

DRUM STOP MECHANISM FOR ROTARY DUPLICATING MACHINES

Filed Aug. 4, 1949

Inventor:
Carl A. Levin
By:
Zahl & Gritzbaugh
Attorneys

Patented July 14, 1953

2,645,174

UNITED STATES PATENT OFFICE 2,645,174

DRUM STOP MECHANISM FOR ROTARY DUPLICATING MACHINES

Carl A. Levin, Park Ridge, Ill., assignor to Ditto, Incorporated, Chicago, Ill., a corporation of West Virginia Application August 4, 1949, Serial No. 108,471

4 Claims. (Cl. 101—132)

The present invention relates to a duplicating machine and in the present instance is illustrated in conjunction with a machine of the wet process type. In this type of machine a master sheet is clamped onto a rotary drum and a plurality of blank sheets are fed one at a time between this drum and a platen that is held in engagement with the peripheral face of the drum. These blank sheets are fed into the bite between the drum and the platen by a pair of feed rollers, at least one of which is moistened over its peripheral surface. As the blank sheets are fed between the feed rollers the moistening roller transfers some of the liquid onto the face of the blank sheet that next engages the master sheet that is mounted on the drum. Typed material on the master sheet is thereby transferred to the moistened sheet and the sheet is then deposited on a tray or platform located on the discharge side of the drum.

It is an object of the present invention to provide a duplicating machine of this type that is electrically driven and one wherein the drum can be selectively stopped at different positions.

It is also an object of the invention to provide a simple device for automatically removing the master sheet from the drum without requiring the operator to place his hands either on the master sheet or on the drum. All of this is intended to be accomplished with a device and mechanism that is extremely simple, both in structure and in operation.

The foregoing constitute some of the principal objects and advantages of the present invention, others of which will become apparent from the following description and the drawings, in which.

For purposes of illustration a single embodiment of the invention is shown in the drawings and will be described hereinafter. It is recognized, of course that many variations may be made in the embodiment shown without departing from the intended scope and spirit of the invention.

Figure 1:
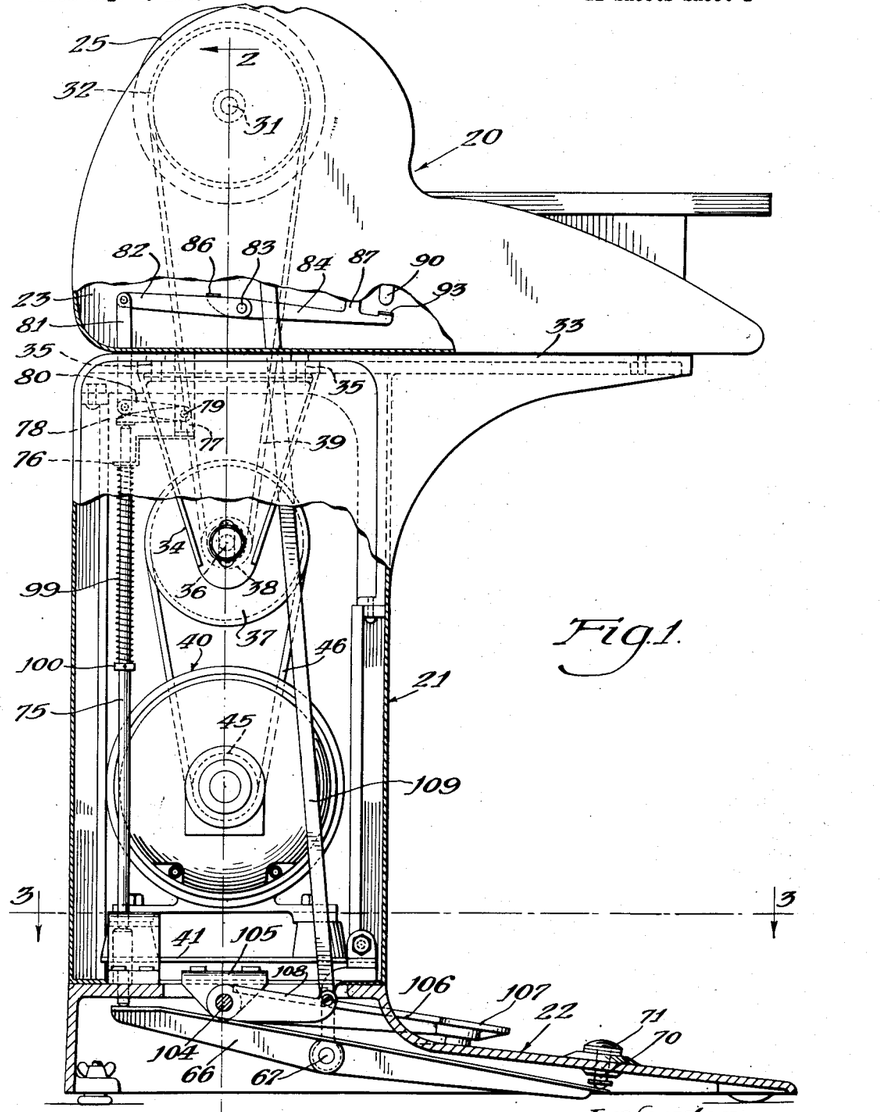
Fig. 1 is a vertical, sectional view taken through the machine and base, the machine being shown mostly in side elevation.

Referring now to Fig. 1 of the drawings a device embodying the present invention is illustrated in the form of a duplicating machine generally indicated at 20 that is mounted on a stand generally indicated at 21 which in turn rests on a base generally indicated at 22.

Figure 2:
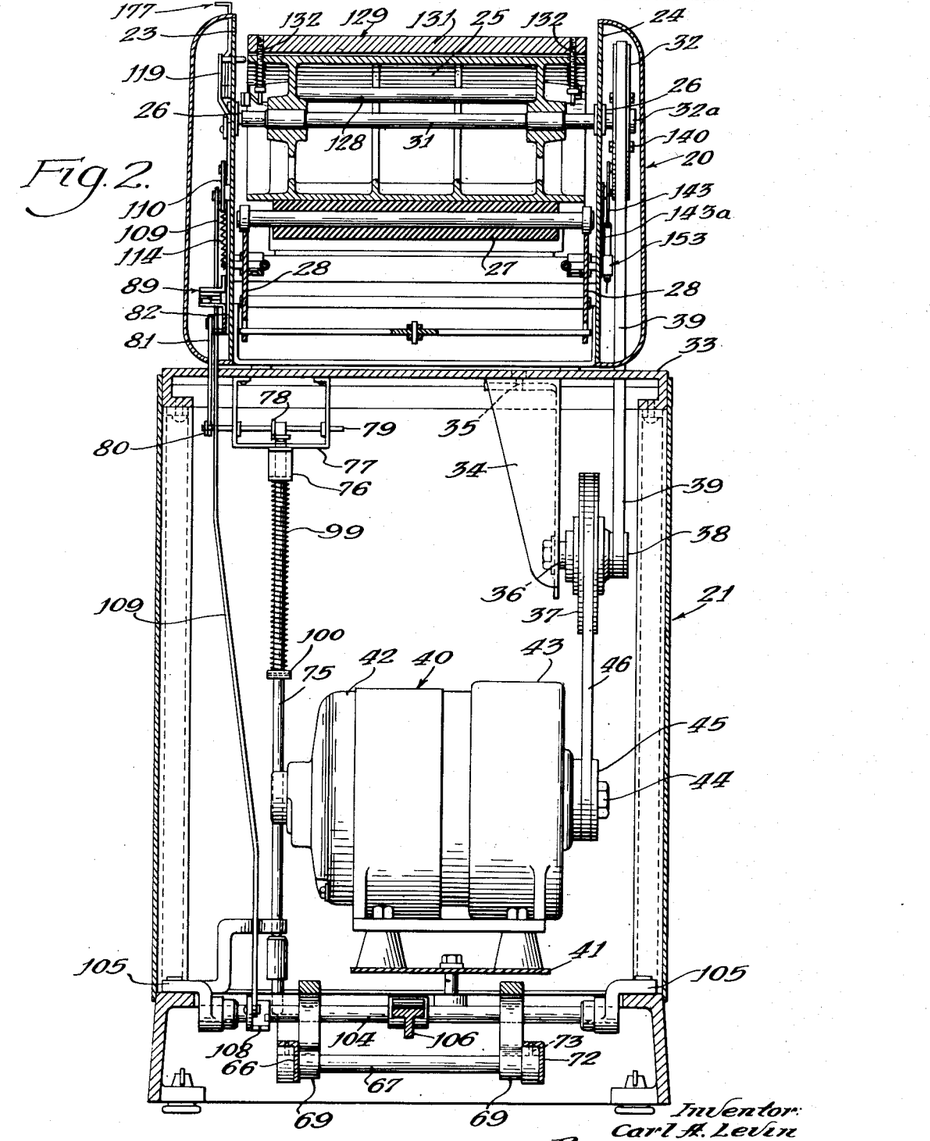
Fig. 2 is a vertical, sectional view taken through the base of the machine, the view being taken along the line 2—2 of Fig. 1.

The machine 20 comprises a pair of upstanding spaced side frame members 23 and 24, between which frame members or walls is disposed a rotatable drum 25 that is journalled as at 26 in the spaced walls 23 and 24. This drum 25 is of a conventional type used in duplicating machines. Directly below the drum 25 is a platen 27 (see Figs. 2 and 12) that engages the peripheral face of the drum 25 and is rotatably mounted on sub-frame members 28 illustrated in Fig. 2. On the feed side of the drum 25 is rotatably mounted a pair of feed rollers 29 and 30 held in engagement with each other, the feed roller 29 also serving as a moistening roller in a conventional manner. The feed rollers 29 and 30 are rotated in a conventional manner simultaneously with the rotation of the drum 25, the manner of rotation of the feed rollers 29 and 30 being intermittent so as to feed copy sheets into the bite between the platen 27 and the drum 25. As best shown in Fig. 2 the drum 25 is mounted on a shaft 31, on one end of which is mounted a pulley wheel 32.

The stand generally indicated at 21 in Figs. 1 and 2 includes an upper wall or platform 33 on which the duplicating machine 20 is mounted. Suspended downwardly from this upper platform 33 is a bracket 34 that is secured in some suitable manner as by screws or rivets 35 to the platform 33. Mounted at the lower end of this bracket 34 is a shaft 36 on which is mounted a large pulley wheel 37 and a small pulley wheel 38. Extending between this small pulley wheel 38 and the pulley wheel 32 on the end of shaft 31 is a drive belt 39. In the lower part of the stand 21 is mounted a motor clutch device generally indicated at 40 that rests on a supporting base 41. This motor clutch device has a motor portion 42 and a clutch portion 43. A shaft 44 extends outwardly from the clutch portion and mounted on this shaft is a pulley wheel 45. A drive belt 46 is mounted over the pulley wheel 45 and over pulley wheel 37 on the shaft 36. When the motor portion 42 is operated and the clutch 43 to be more fully described hereinafter, is energized, the shaft 44 is rotated so as to drive the drum 25 of the duplicating machine 20 through belt 46, pulley wheel 37, belt 39 and pulley wheel 32. In this manner the drum 25 and platen 27 are rotated and power from the same source is likewise transmitted to the feed rollers 29 and 30 in a conventional manner (not shown).

Figure 6:
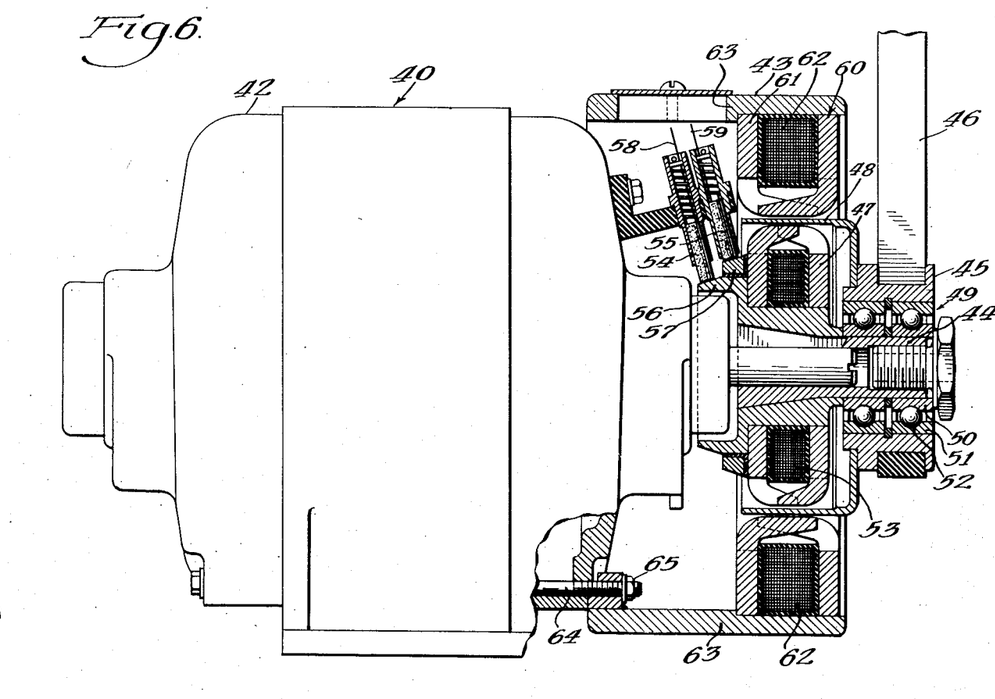
Fig. 6 is a side elevational view shown partly in section of the motor clutch unit forming the drive for the present machine.

Referring now to Fig. 6 the motor clutch device 40 includes a conventional motor 42 that is provided with the motor shaft 44. The clutch portion 43 of the motor clutch device 40 comprises a rotor 47 that is keyed or otherwise fixed to the motor shaft 44, and a cup-like stator 48 that is fixed to the pulley wheel 45. Between the motor shaft 44 and the pulley wheel 45 is a ball bearing assembly generally indicated at 49 that includes inner race members 50 that are fixed with respect to the motor shaft 44 and outer race members 51 that are adapted to sandwich therebetween ball bearings indicated at 52. Thus the motor shaft 44 with its electromagnetic rotor 47 is rotated independently of the pulley wheel 45 and the cup-shaped stator 48.

The rotor 47 may be of a conventional type for a magnetic clutch that includes a field winding 53 that is energized from an electrical source through contact brushes 54 and 55 that operate on commutators 56 and 57 respectively. The field winding 53 is placed in an electrical circuit with the commutators 56 and 57 in a wellknown manner and the brushes 54 and 55 are placed in a circuit with a source of electrical current by suitable conductors 58 and 59 respectively. Thus during the operation of the motor the motor shaft 44 is rotated and the field winding 53 of the electromagnetic clutch is caused to rotate with the motor shaft 44. During the period when the field winding 53 of the rotor is deenergized this rotor 47 rotates with the shaft 44 while the pulley wheel 45 and the stator 48 remain stationary. Upon closing of the circuit through the brushes 54 and 55 the field winding 53 of the rotor 47 becomes energized so as to rotate the stator 48 with the rotor 47, thereby rotating the pulley wheel 45. The drive for the drum 25 is thus established through the driving belts previously described and shown in Fig. 2.

Mounted on the frame of the motor clutch unit 40 (Fig. 6) is an electromagnetic brake generally indicated at 60 that includes a stationary electromagnetic field ring 61 supporting an electromagnetic field winding 62. This fixed ring is supported on an annular supporting ring 63 that is fixed to the machine casing in a suitable manner as by a plurality of bolts, one of which is illustrated at 64 in Fig. 6 threaded to receive a nut 65. This field winding 62 is connected through a suitable electrical circuit to a source of electrical current and will be more fully described hereinafter in connection with the wiring diagram illustrated in Fig. 19. Upon energizing the field winding 62 of the electromagnetic brake 60 the rotating stator 48 of the electromagnetic clutch 43 is brought to rest in a well-known manner resulting in the sudden stopping of the rotating drum 25 of the duplicating machine 20.

Figure 3:
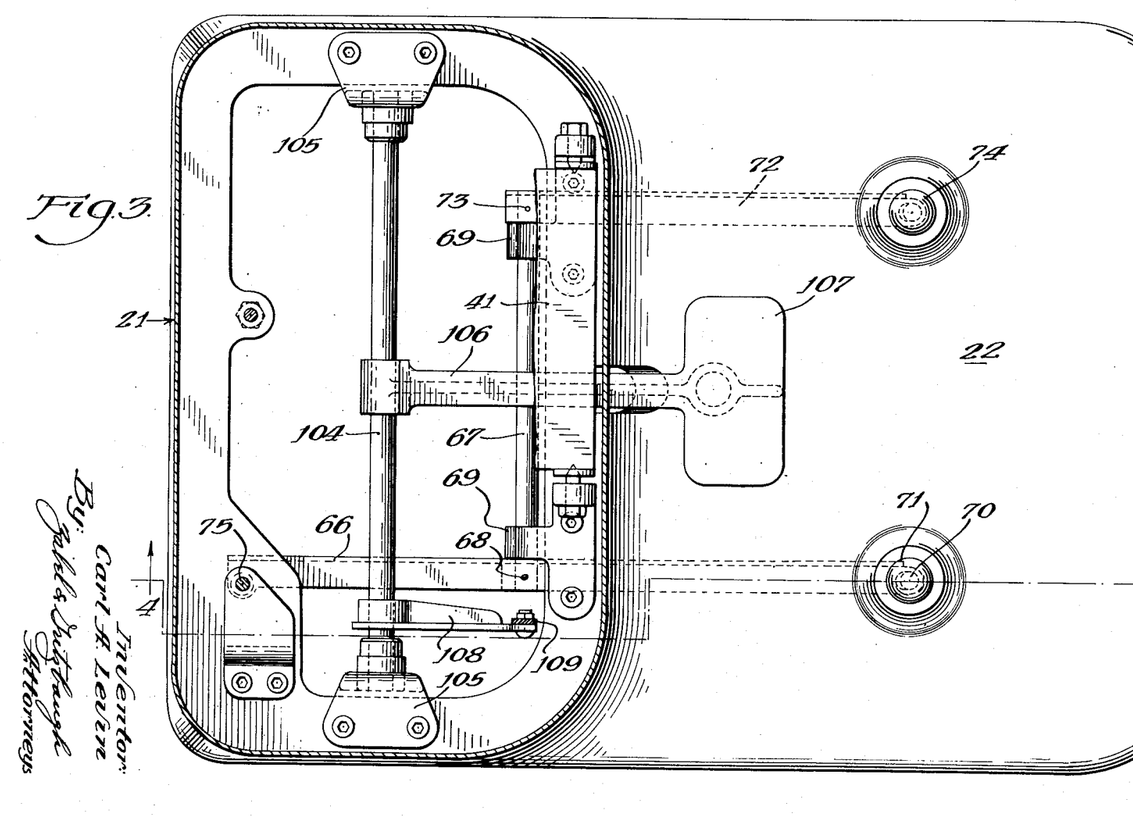
Fig. 3 is a horizontal, sectional view taken through the base of the machine, the view being taken along the line 3—3 of Fig. 1.

Disposed in the base 22 (see Figs. 1, 3 and 4) is a lever 66 that is mounted substantially at its midpoint on a shaft 67 to which the lever 66 is secured by a pin or the like shown at 68 in Fig. 3. This shaft 67 in turn is journalled adjacent to its opposite ends in bearing members 69 (Fig. 3) that are fixed with respect to the base 22. Lever 66 extends to the forward end of the base 22 and mounted in the base 22 directly over the forwardmost end of the lever 66 is a foot trip button 70 that is slidable in a substantially vertical direction in the base 22 and extends upwardly above the base, having on its upper end a knob 71. As best shown in Fig. 3 there is mounted on the opposite end of the shaft 67 a lever indicated at 72 that is pinned as at 73 to the shaft 67 and projects forwardly toward the forwardmost end of the base 22 a distance corresponding to that of lever 66. A second foot operated trip button 74 is mounted in the base 22 directly over the forwardmost end of this second lever 72. Thus when either of the foot operated trip buttons 70 or 74 is depressed, the lever 66 is caused to pivot with the shaft 67 as its fulcrum.

Figures 4, 5:
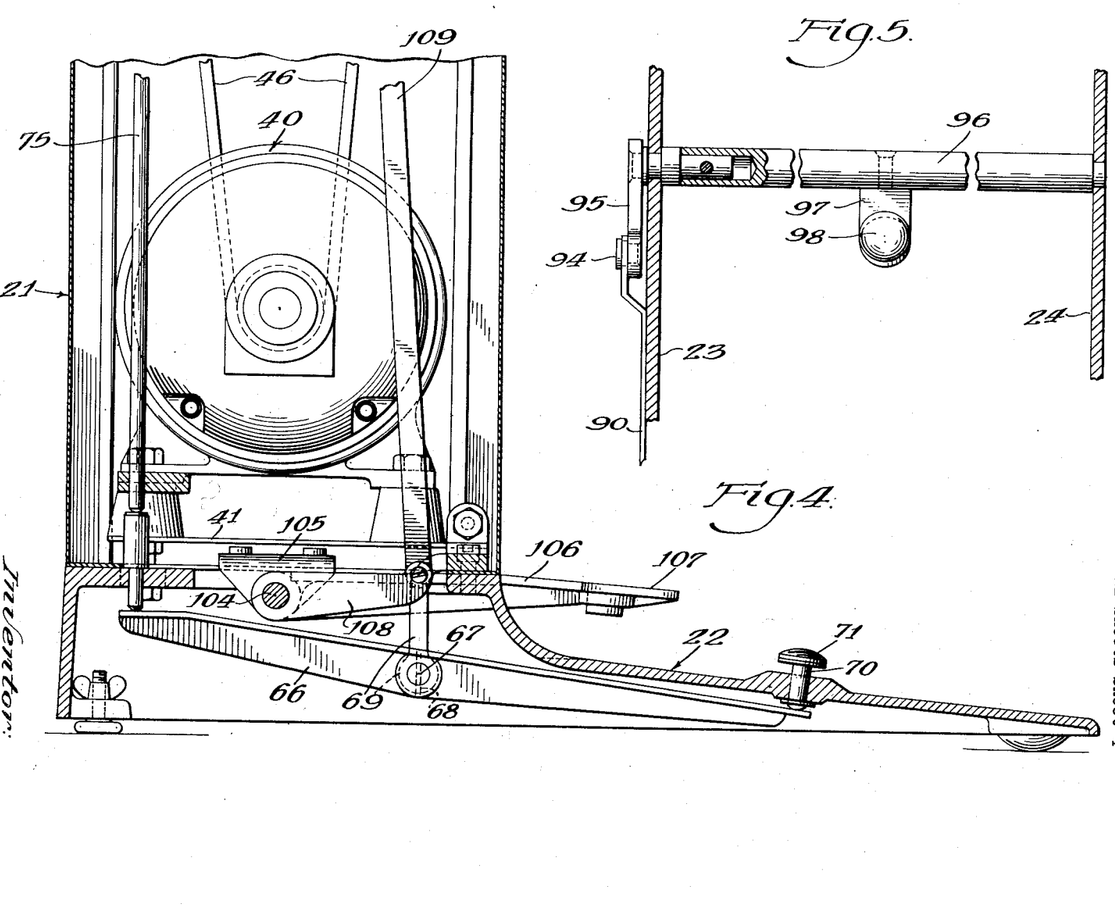
Fig. 4 is an enlarged, fragmentary, vertical, sectional view through the lower part of the machine base.
Fig. 5 is an enlarged, fragmentary, detail view shown partly in section of the manual push button operating mechanism.
Figure 7:
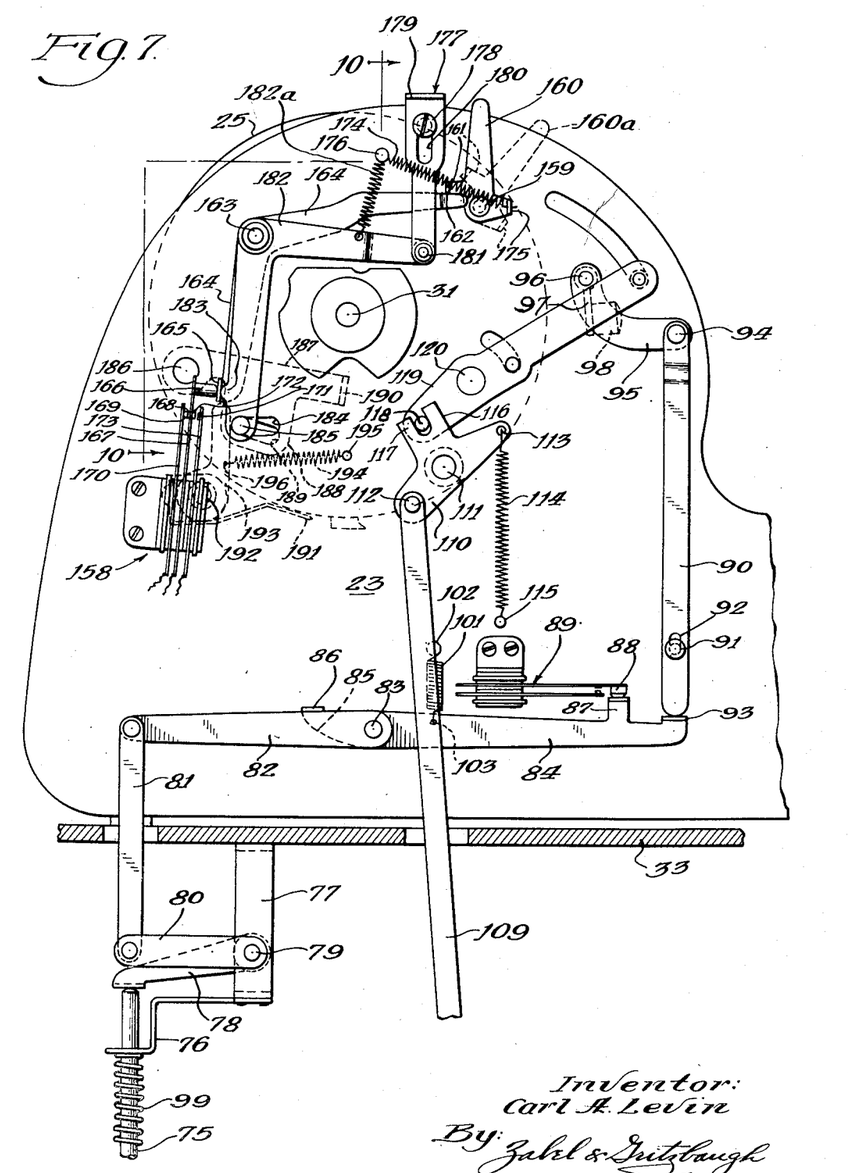
Fig. 7 is an enlarged, fragmentary, side elevational view of the machine proper, taken from one side of the machine with part of the case removed, illustrating certain of the operating mechanisms for the machine.
Figure 12:
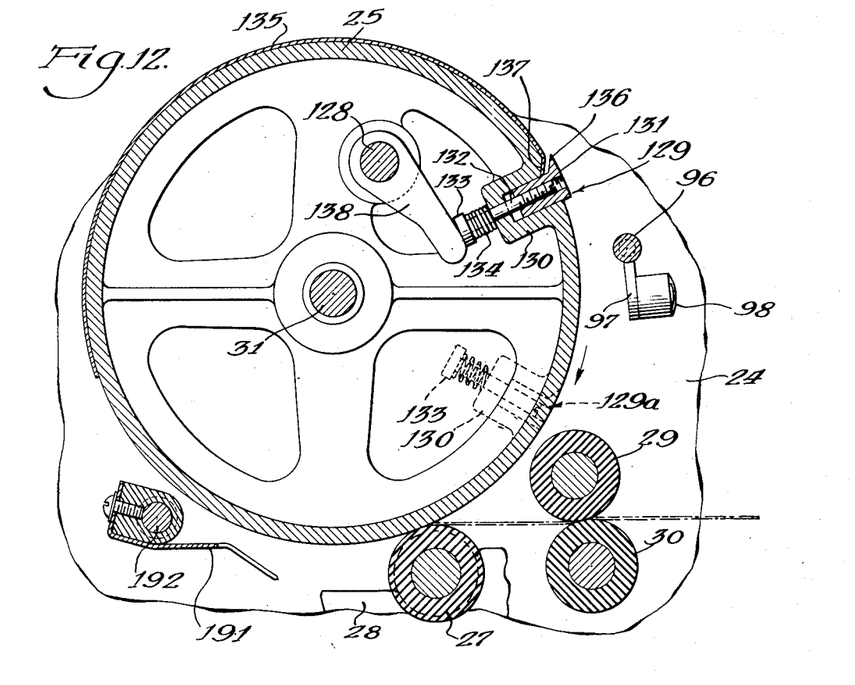
Fig. 12 is a fragmentary, vertical, sectional view through the machine, the view being taken along the line 12—12 of Fig. 10.

The free end of lever 66 engages the lowermost end of a lower segment 75a of a vertical rod 75 that extends vertically through the stand 21 as best seen in Figs. 1 and 4 and projects downwardly into the base 22. The upper end of rod 75 projects through the aperture in a bracket 76 that is fixed to the frame of the stand 21. Pivotally mounted on a portion 77 of the frame of stand 21 is a lever arm 78 that engages the upper end of the vertically disposed rod 75. This lever arm 78 is fixed to a shaft 79 that is rotatably mounted in the portion 77 of the frame (see Fig. 2). Also mounted in fixed relationship on the shaft 79 is a lever arm 80 to the free end of which is pivotally mounted a link 81. The upper end of this link 81 is pivotally mounted on one end of a lever 82 (see Fig. 7). This lever 82 in turn is pivotally mounted at its opposite end at 83 to the side wall 23 of the machine. A second arm 84 is also pivoted at 83 to the side wall 23 of the machine and this second lever arm 84 is provided with a rearwardly extending portion 85 having a horizontally extending flange 86 thereon that overlies the top of lever 82. Mounted adjacent to the free end of the lever arm 84 is an upstanding boss 87 that is adapted to engage a lug or knob 88 on a trip switch generally indicated at 89. Disposed over the free end of lever arm 84 is a link 90 that is slidably mounted as at 91 on a pin that is secured to the side wall 23 of the machine, this pin being adapted to ride in a slot 92 in the link 90. This link 90 projects downwardly below the pin 91 and engages a horizontally disposed flange 93 on the end of lever arm 84. The upper end of link 90 is pivotally mounted at 94 onto one end of a lever arm 95. The other end of this lever arm 95 is mounted in fixed relationship on a horizontally disposed shaft 96 that is journalled between the side walls 23 and 24 of the machine. As best shown in Figs. 5, 7 and 12 an arm 97 extends downwardly from this shaft 96 and is provided on its free end with a hand operated trip button 98 that is disposed on the front of the machine.

Again referring to Fig. 2 there is provided about the upper end of the vertical rod 75 a compression spring 99 that is seated between the bracket 76 at the upper end thereof and a collar 100 that is fixed to the rod 75. When either of the foot operated trip buttons 70 or 74 (Fig. 3) or the hand operated trip button 98 (Fig. 5 or 7) is depressed, the lever arm 84 is caused to rotate in a clockwise direction about its axis of rotation indicated at 83 in Fig. 7 so as to close the normally open trip switch 89. Upon release of pressure on the foot operated trip buttons 70 or 74 or the hand operated trip button 98, a spring 101 (Fig. 7) returns the lever arm 84 to its normal trip switch open position (Fig. 7). This spring 101 is fixed at one end as at 102 to the side frame 23 of the machine and at the other end as at 103 to the lever arm 84.

The operation of the hand operated trip button 98 is best understood from the showing in Fig. 7. When this trip button 98 is depressed it rotates the shaft 96 in a clockwise direction as viewed in Fig. 7 so as to rotate the arm 95 in the same direction. This moves link 90 in a downward direction against the flange 93 on the end of lever arm 84 so as to rotate this lever arm 84 in a clockwise direction about its axis of rotation indicated at 83.

When either of the foot operated trip buttons 70 or 74 is depressed it rotates the lever 66 in the manner previously described with respect to the showing in Figs. 1 and 4, this rotation being in a clockwise direction as viewed in Fig. 4 so as to move the rod 75 in an upward direction against the pressure of compression spring 99. This upward movement of the rod 75 (see Fig. 7) rotates the lever arm 78 in a clockwise direction so as to similarly rotate the shaft 79. This causes rotation in a clockwise direction as viewed in Fig. 7 of the arm 80, carrying with it in an upward direction a link 81. As a result of this the lever 82 rotates in a clockwise direction about its axis of rotation indicated at 83 so as to apply an upward force against the flange 86 that extends over the top of lever 82, thereby effecting rotation of lever arm 84 in a clockwise direction about its axis of rotation indicated at 83. Once again the trip switch 89 is closed as previously described.

Referring to Figs. 1 and 3 a horizontal shaft 104 is journalled at its opposite ends in brackets 105 that are secured to base 22. Extending outwardly from the center of this shaft 104 is an arm 106 that is fixed to the shaft and this arm projects through the front wall of the base 22 and is provided on its free end with a foot pedal 107. Also fixed to the shaft 104 is an arm 108, to the free end of which is secured a link 109 that extends upwardly through the stand 21 and into the machine 20 (see Fig. 7). Adjacent to the upper end of this link 109 is disposed a bell crank lever 110 that is pivoted about an axis 111 that is fixed to the machine side frame 23. The link 109 is secured as at 112 to one end of the bell crank 110, whereas the other free end of the bell crank is fastened as at 113 to one end of a tension spring 114. The other end of the spring 114 is fastened at 115 to the machine side wall 23. An intermediate arm 116 of the bell crank lever 110 is provided with bifurcated jaw portions 117 that are adapted to receive therebetween a pin 118 that extends outwardly from one end of another bell crank lever 119. This latter bell crank lever 119 is pivoted as at 120 to a fixed pin on the wall 23 of the machine (see Figs. 7 and 8).

Figure 8:
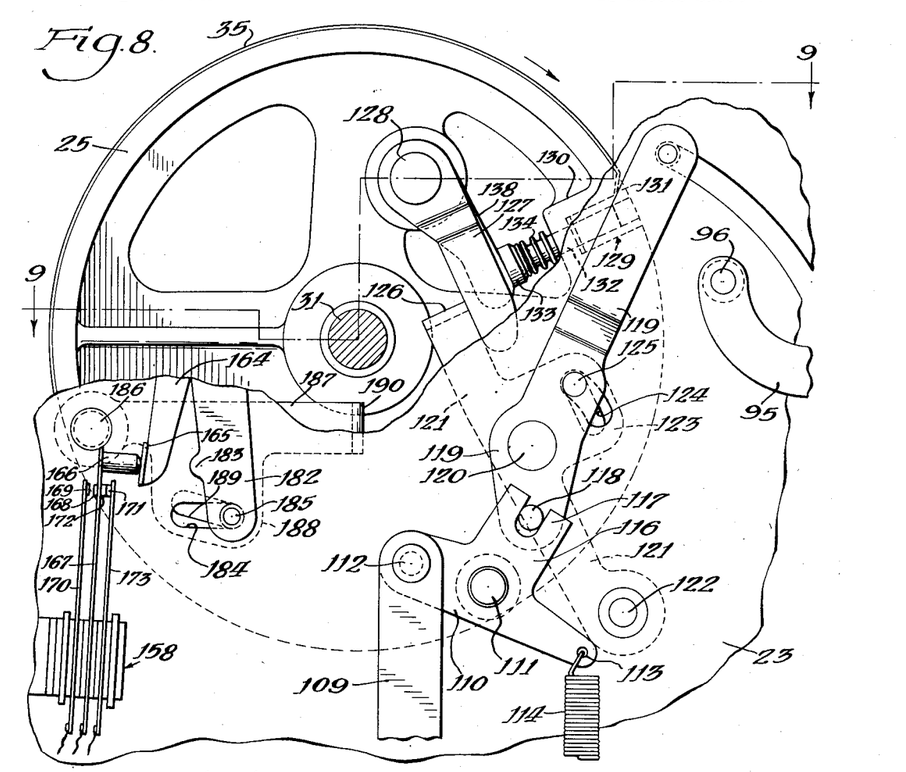
Fig. 8 is an enlarged, fragmentary, side elevational view of the machine proper taken from the same side of the machine, with a portion of the side frame of the machine broken away to illustrate the master clamp operating mechanism.
Figure 9:
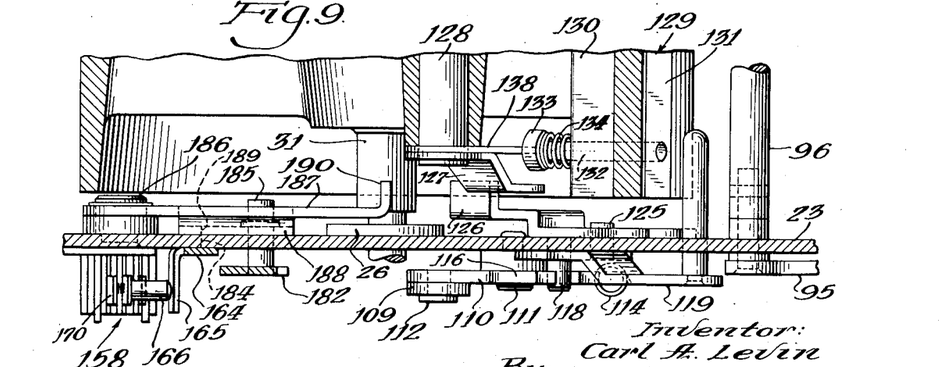
Fig. 9 is a fragmentary, horizontal, sectional view through the machine, the view being taken along the line 9—9 of Fig. 8.

Mounted behind the bell crank lever 119 is a lever arm indicated at 121 in Fig. 8 that is pivoted as at 122 to the machine side wall 23. This arm 121 is provided with an outwardly projecting portion 123 intermediate its ends that is slotted as at 124 to receive a lug 125 that projects from the bell crank lever 119. The free end of lever 121 is provided with a turned-over flange 126. Mounted adjacent to this last mentioned end of the lever arm 121 is an actuating arm 127 that is pivoted onto a shaft 128 that is journalled about its opposite ends on the drum. As best shown in Fig. 12 the drum 25 is provided with a conventional master clamp assembly generally indicated at 129 that includes a housing portion 130 formed in the drum 25, and a movable clamp member 131 that is slidable in and out of this housing portion 130. A pair of spaced posts 132 is secured to the movable clamp member 131, and each post 132 is provided with a head 133 so as to form one seat for a compression spring 134 that fits between this head 133 and the wall of the housing 130. Thus the compression spring 134 normally holds the master clamp member 131 in its innermost position in the housing 130.

A master sheet is illustrated in Fig. 12 at 135 in its position on the drum 25. One end of this master sheet is adapted to be clamped between a jaw member 136 on the movable master clamp member 131 and a seat portion 137 on the drum 25 that forms in effect a complementary jaw that cooperates with the movable jaw 136. In the position shown in Fig. 12 the master sheet 135 can be placed on the drum and the end to be clamped is positioned between the movable clamp 136 and the seat 137. In this position the movable clamp member 131 is disposed in its outermost position with the compression spring 134 fully compressed. To place the movable clamp member 131 in this open position an arm 138 is fixed to shaft 128 and when this arm is in the position shown in Fig. 12 it engages the head 133 of post 132 to compress spring 134 and place the movable clamp member 131 in its open position.

In the embodiment of the invention shown there are two such posts 132 and hence two arms 138 are provided on shaft 128, each being suitably located to engage its corresponding post 132. Movement of arm 138 about its axis of rotation, which is the shaft 128, is effected by rotating this shaft 128 either in a clockwise or counterclockwise direction, depending upon the desired position of arm 138. Movement of arm 138 in a clockwise direction as viewed in Fig. 12 will permit the movable master clamp member 131 to return to its closed position in response to the expansion of compression spring 134.

Shaft 128 is rotated in response to movement of foot pedal 107, this movement being imparted to the shaft 128 through arm 108, link 109 (Figs. 1, 4, 7 and 8) bell crank levers 110 and 119, arm 121 and finally arm 127, which in turn is secured to shaft 128. The spring 114 normally holds the mechanism just described so that the foot pedal 107 is in its uppermost position in condition to be moved downwardly so as to rotate shaft 104 (see Fig. 1) in a clockwise direction. The drum 25 when in the position shown in Fig. 12 where the master clamp 129 can be opened and closed in the manner just described is in what is commonly called the "master clamp position."

Figures 14, 15:
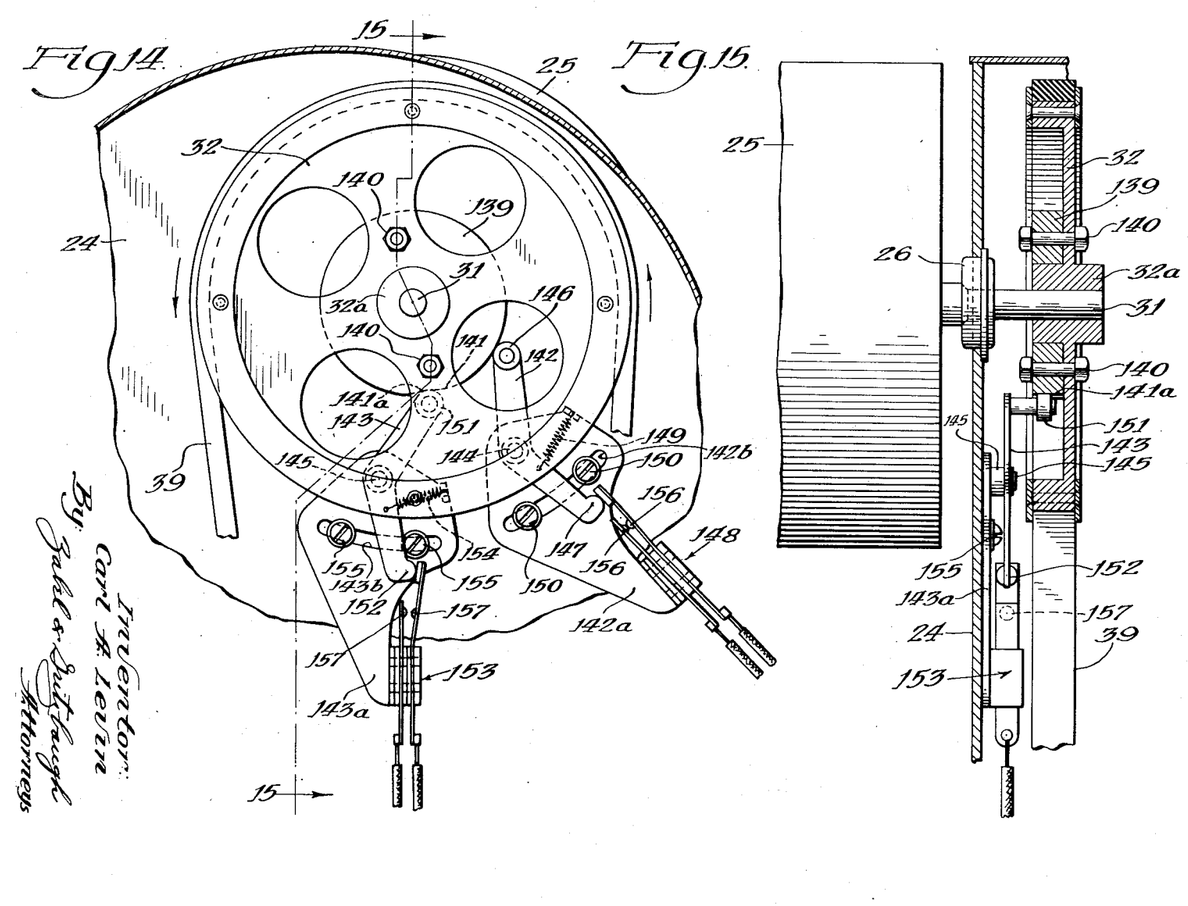
Fig. 14 is a fragmentary, side elevational view with a portion of the case removed, the view being taken from the other side of the machine from that shown in Figs. 7 and 8.
Fig. 15 is a fragmentary, vertical, sectional view taken through the machine, the view being taken along the line 15—15 of Fig. 14.

Mounted on the shaft 31 of the drum 25 as best shown in Figs. 14 and 15 is a cam 139. This cam 139 (see Fig. 15) is actually mounted concentrically about the hub portion 32a of the pulley wheel 32 and is secured to the pulley wheel by means of a plurality of nuts 140. This cam 139 has substantially a circular circumference throughout most of its periphery but is provided with an inwardly cam valley portion 141 that has an innermost concave portion 141a at one position on the circumference of the circle. Bell crank levers 142 and 143 are pivotally mounted as at 144 and 145 respectively on plates 142a and 143a respectively. These plates 142a and 143a are provided with arcuate slots 142b and 143b respectively and are secured to the machine wall 24 by screws 150 and 155 passing through slots 142b and 143b respectively.

These bell crank levers 142 and 143 are disposed at the same distances from the shaft 31 about the center of which the cam 139 rotates, but are spaced at different positions circumferentially with respect to the cam 139. The bell crank lever 142 is provided with a cam follower 146 at the end of one of the arms and with a switch actuating knob 147 at the free end of the other arm. The follower 146 is adapted to ride along the peripheral surface of the cam 139 and the switch actuating knob 147 is adapted to engage and operate a switch generally indicated at 148. A tension spring 149 normally serves to urge the bell crank lever 142 to rotate in a counterclockwise direction as viewed in Fig. 14 so as to hold the cam follower 146 firmly against the periphery of the cam 139.

Similarly the bell crank lever 143 is provided at one end of one of its arms with a cam follower 151 that is adapted to ride on the peripheral surface of the cam 139. The other arm of the bell crank lever 143 is provided with a switch actuating knob 152 that actuates the electrical switch generally indicated at 153. A tension spring 154 normally urges the bell crank lever 143 to rotate in a counterclockwise direction as viewed in Fig. 14 so as to cause the follower 151 to rest firmly against the peripheral edge of the cam 139. Thus as the cam 139 rotates with shaft 31 the cam followers 146 and 151 ride along the peripheral edge of cam 139 and while the cam follower is riding along the normal circumference of uniform radius, the switches 148 and 153 are maintained in their closed position illustrated in Fig. 14 where the switch points 156 of switch 148 are in contact with each other. When either of the cam followers 146 or 151 rides down into the valley or concave portion 141, the corresponding bell crank 142 or 143 rotates in a counterclockwise direction about its respective axis of rotation so as to separate the corresponding contact points as shown in the case of switch 153 where contact points 157 are separated. In this latter position switch 153 is open. The exact position of the bell crank levers 142 and 143 can be carefully adjusted by movement of plates 142a and 143a respectively. The position of these plates is fixed by tightening screws 150 and 155.

As will be described hereinafter switches 148 and 153 are made to operate in the control circuit which will also be described hereinafter by manipulation of a selector switch generally indicated at 158 in Fig. 7.

Pivotally mounted as at 159 (Fig. 7) on the wall 23 of the machine is a selector arm 160. This selector arm has provided thereon an actuating projection 161 on the free end of which is an out-turned flange 162. Also mounted on the machine wall 23 for pivoting as at 163 is a bell crank lever 164, one arm of which is disposed adjacent to the flange 162 on the selector arm 160. The other arm of the bell crank lever 164 is provided adjacent to its free end with an out-turned flange 165 that is adapted to engage a knob or lug 166 that is disposed on a central leaf 167 of the switch 158. This central leaf 167 has a contact point 168 on one side that is adapted to engage a corresponding contact point 169 on a leaf 170 of the switch 158. On the opposite side of the central leaf 167 is a second contact point 171 that is adapted to engage and make electrical contact with a contact point 172 on a third leaf 173 of the switch 158.

When the selector arm 160 is in the solid line position shown in Fig. 7 the bell crank lever 164 maintains the contact points 168 and 169 of switch 158 in engaged or closed circuit condition. When the selector arm 160 is moved in a clockwise direction to the position shown in broken lines at 160a in Fig. 7 the bell crank lever 164 is rotated in a counterclockwise direction about its axis of rotation 163 as viewed in Fig. 7 so as to allow the central leaf 167 to move in a clockwise direction as viewed in Fig. 7 to open the contacts 168 and 169, and close contacts 171 and 172. A spring 174 fastened to the selector arm 160 at 175 and at the other end to the side wall 23 of the machine at 176 serves to hold the selector arm 160 either in its solid line position shown in Fig. 7 or in its broken line position shown at 160a.

Again referring to Fig. 14 the switch 148 may be termed for purposes of illustration the "seventeen inch position switch," whereas the switch 153 may be termed the "fourteen inch position switch." By this is meant that when copy sheets seventeen inches long are being passed through the machine the seventeen inch switch 148 is brought into the control circuit, whereas when fourteen inch length copy sheets are being used the fourteen inch switch 153 is placed into the circuit. The selection as between these two switches is made by manipulation of selector switch 158 (Fig. 7) in the manner just described by manual operation of selector arm 160.

Under certain circumstances it may be desirable to remove the master sheet from the machine autimatically. To accomplish this a manual operated master ejector button 177 (see Fig. 7) is mounted to slide up and down on a pin 178. This master ejector button 177 is shown in the form of a plate-like member provided with an over-turned flange 179 at its upper end and is vertically slotted at 180 so that it can ride vertically on the pin 178. The lower end of the button member 177 is pivotally attached as at 181 to one arm of a bell crank lever 182. Adjacent to the free end of the other arm of the bell crank lever 182 is disposed a switch actuating knob or projection 183 that is adapted to abut against the flange 165 of bell crank lever 164 so as to move the central leaf 167 of switch 158 to the position shown in Fig. 7 where contacts 168 and 169 are closed. The bell crank lever 182 is normally biased to hold button 177 in its uppermost position by spring 182a.

Figure 10:
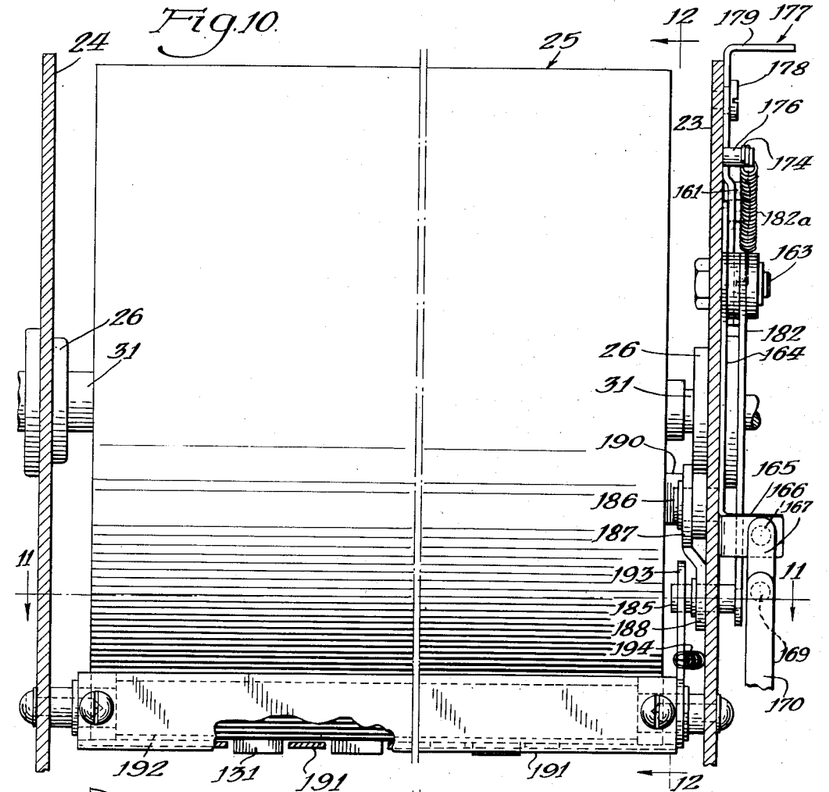
Fig. 10 is a fragmentary, vertical, sectional view through the machine, the view being taken along the line 10—10 of Fig. 7.
Figure 11:
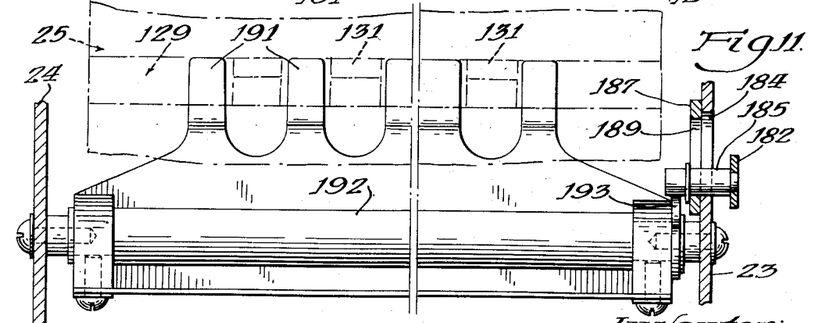
Fig. 11 is a horizontal, sectional view taken through the machine, the view being only fragmentary and taken along the line 11—11 of Fig. 10.
Figure 13:
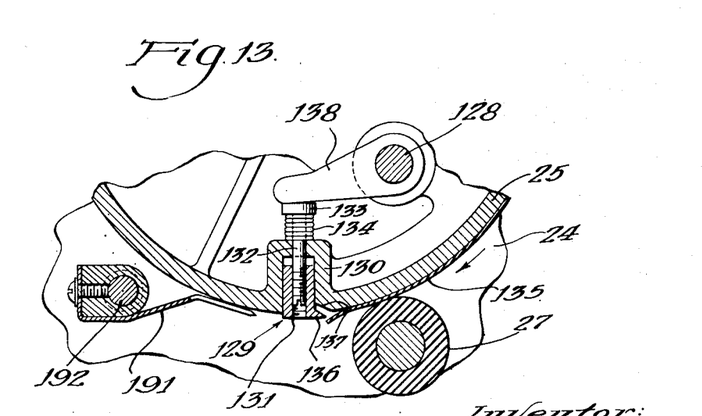
Fig. 13 is a fragmentary view corresponding to Fig. 12 but illustrating the master clamp operating mechanism in master release position for automatically discharging the master sheet.

Adjacent to the free end of the last mentioned arm of bell crank lever 182, there is provided in the machine wall 23 a horizontal slot indicated at 184, through which projects a lug 185 that is fastened to the free end of the last mentioned arm of bell crank lever 182. Disposed on the inside of this machine wall 23 and pivoted as at 186 to the wall is an arm 187 (see Fig. 7) that is provided with a downwardly projecting portion 188 that is slotted at 189 to receive the free end of lug 185. The arm 187 is also provided with an inturned flange portion 190. The arm 187 is adapted to move about its axis of rotation 186 from a more or less horizontal position shown in Fig. 8 that corresponds to the uppermost position of the ejector button 177 to a downwardly inclined position illustrated in Fig. 7 corresponding to the depressed position of the master ejector button 177. In this latter position corresponding to the depressed position of the master ejector button 177 the flange 190 on the lever 187 is disposed in the path of arm 127 (Fig. 8) as the drum rotates. Thus the flange 190 engages arm 127 when the latter is in proper position so as to rotate shaft 128 to move arm 138 (see Fig. 13) to open master clamp 129 so as to release the master sheet shown at 135. In other words, when the master ejector button 177 is depressed and held in this depressed condition shown in Fig. 7 the master clamp 129 is momentarily opened when the drum reaches the position shown in Fig. 13 by virtue of the fact that arm 127 (Fig. 8) strikes the flange 190 on arm 187. A stripper 191 mounted on a shaft 192 is disposed adjacent to the drum at this master release position shown in Fig. 13. This shaft 192 is rotatably mounted, and fixed to the shaft is an arm 193 (Figs. 10 and 11) that is engaged by the lug 185. Thus when the master ejector button 177 is depressed the arm 193 is rotated in a counterclockwise direction about the center of shaft 192 carrying with it the shaft and moving the stripper 191 to the broken line position shown in Fig. 7. This stripper is normally maintained by a spring illustrated at 194 in the inoperative position illustrated in Fig. 12. This spring 194 is secured at one end as at 195 to the side wall 23 of the machine and at the other end at 196 to the arm 193.

*Operating circuit*

Figure 16:
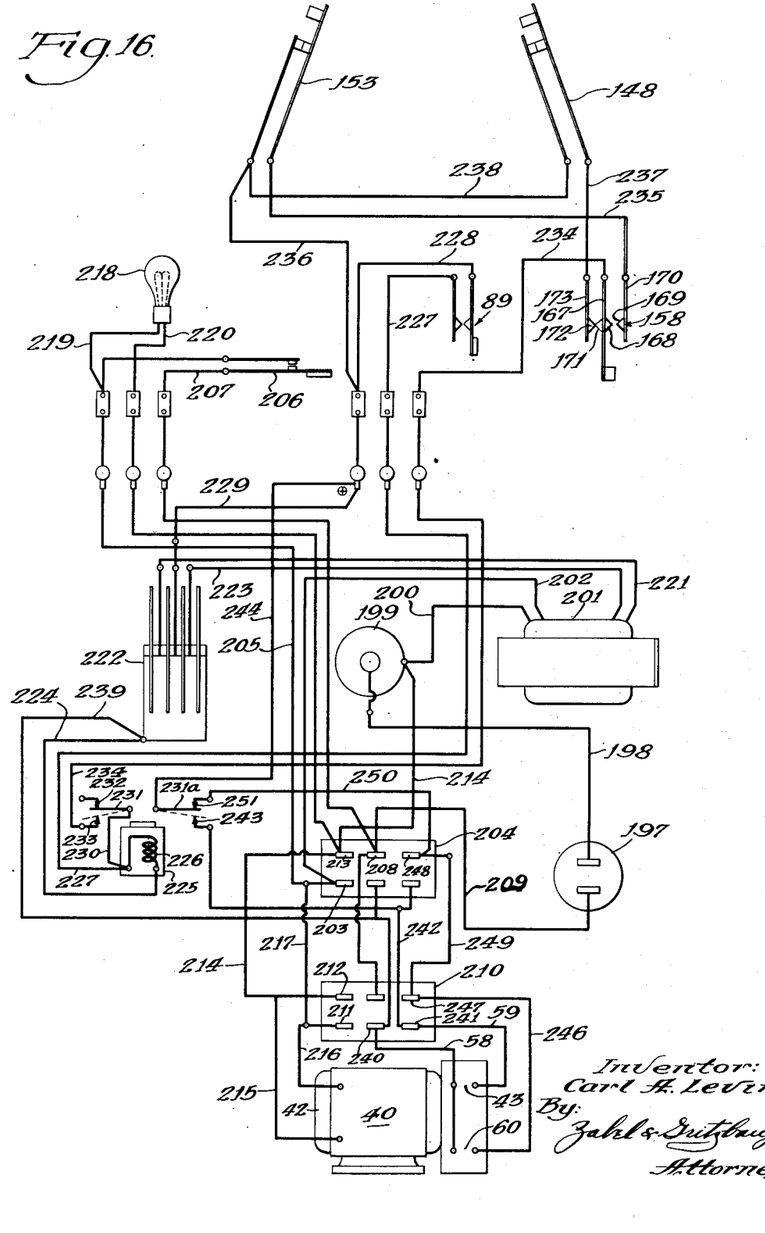
Fig. 16 is a wiring diagram illustrating the electrical circuit for controlling and operating the present machine.

The electrical circuit for the operation and control of the duplicating machine just described is shown in Fig. 16. The power line or source of current is illustrated at 197. From this power line a conductor 198 is connected to a fuse 199. The other side of the fuse 199 is connected by a conductor 200 to one side of the primary winding of a transformer 201. From the other side of the primary winding of transformer 201 is a conductor 202 that is connected to one terminal 203 of a receptacle 204. To this terminal 203 is connected a conductor 205 that is connected to one side of a main power switch 206 that is conveniently located on the machine. To the other side of power switch 206 is connected a conductor 207 that is connected at its other end to terminal 208 of the receptacle 204 and then through conductor 209 to the other side of the power line 197. Thus when the power switch 206 is closed the circuit just described to the primary side of the transformer 201 is energized.

A plug 210 is adapted to be inserted in the receptacle 204 and when this is done terminal 211 on the plug 210 engages terminal 203 of receptacle 204 and terminal 212 of plug 210 engages terminal 213 of receptacle 204. Thus the motor clutch device 40 is placed in a circuit that includes the power line 197, conductor 198, fuse 199, a conductor 214, terminal 213 of receptacle 204 which at this time as is diagrammatically indicated by conductor 214 is connected to terminal 212 on plug 210, and then through line 215 to one side of the motor clutch device 40 and then from the other side of the motor clutch device 40 through conductor 216, terminal 211 on the plug 210 and hence through terminal 203 of receptacle 204 (shown connected to terminal 211 of plug 210 by conductor 217) and hence through conductor 205, power switch 206 and conductor 207 to terminal 208 of receptacle 204, and finally back to the other side of the power line 197 through conductor 209. At the same time that this power circuit just described is closed there is a light circuit that is energized so as to illuminate light bulb 218. This circuit includes a conductor 219 connected at one end to the live line 205 and at the other end to the light bulb 218. Conductor line 220 is connected at one end to the other side of light bulb 218 and at the other end is connected to the live terminal 213 of receptacle 204.

To the secondary winding of the transformer 201 is connected a conductor 221 that is also connected to one side of a rectifier 222. The other side of the rectifier 222 is connected by means of a conductor 223 to the other side of the secondary winding of transformer 201. From the other side of rectifier 222 there is connected a conductor 224 that extends to one side of a clutch relay indicated at 225. The clutch relay winding for clutch 225 is indicated at 226. A conductor 227 connects the other side of clutch relay winding 226 to one side of the trip button 89. The other side of the trip button 89 is connected by means of conductor 228 and conductor 229 to the other side of the rectifier 222. The trip buton 89 is normally held in open condition but when it is closed the clutch relay winding 226 is placed in the circuit with the rectifier 222, and hence the secondary of transformer 201, and is thereby energized. To one side of the relay winding 226 there is also connected a conductor 230 that extends to one side of a relay switch 231 that is operated by relay 225. This relay switch 231 is normally spring biased in open position against a stop indicated at 232. An electrical contact indicated at 233 is adapted to be engaged by relay switch 231 and this contact 233 is connected by means of a conductor 234 to the central leaf 167 of the selector switch 158. This selector switch 158 can either close a circuit that includes the switch 153 or a circuit that includes switch 148. To accomplish the first the central leaf 167 is moved to bring contact points 168 and 169 together and the circuit then includes a conductor 235 that is connected at one end to leaf 170 of selector switch 158. The other end of conductor 235 is connected to one side of the switch 153. The other side of switch 153 is connected through conductors 236 and 229 to the rectifier 222. The circuit through the relay winding 226 is thus completed from the rectifier 222 through the conductor 224.

When the central leaf 167 of selector switch 158 is moved so as to bring contact points 171 and 172 into engagement a circuit is completed through leaf 173 of switch 158 and conductor 237 to one side of switch 148. The other side of switch 148 is connected through conductor 238 to conductor 236 and the circuit can then be traced in the manner just described except through switch 148 instead of switch 153. The circuit just described may be referred to as a holding circuit for the clutch relay 225. The circuit previously described that connected the trip button 89 may be referred to as the initial actuating circuit for the clutch relay 225. This actuating circuit, however, is only momentarily energized so long as the trip button 89 is depressed, but as soon as this trip button 89 is released the holding circuit maintains the clutch relay 225 energized until the holding circuit is interrupted by manipulation of one of the switches 148 or 153.

To one side of the rectifier 222 there is connected a conductor 239 that is connected at its other end to terminal 240 of plug 210. Conductor 58 of the clutch shown in Fig. 6 is attached to this terminal 240 so as to connect the brush 54 to one side of the circuit. Conductor 59 connects brush 55 of the clutch 43 to terminal 241 of plug 210. To this terminal 241 is connected a conductor 242, which in turn is connected to a switch contact 243 of the clutch relay or circuit breaker. In this instance a second switch blade 231a is provided in the clutch relay circuit breaker that moves in response to the operation of the clutch relay 225. To the relay circuit breaker or switch blade 231a is connected a conductor 244, which in turn is connected through conductor 229 to the other side of the rectifier 222.

Also connected to the terminal 240 of plug 210 through conductors 58 and 245 is the magnetic brake indicated at 60 (see Fig. 6). A conductor 246 (Fig. 16) connects the other side of brake 60 to a terminal 247 of plug 210 and hence through terminal 248 of receptacle 204 (shown connected to terminal 247 by conductor 249) and through conductor 250 to a contact point 251 of the relay switch. As shown in Fig. 16 the switch blade 231a normally engages the contact point 251 so that the brake circuit just described is completed through this blade and hence through conductors 244 and 229 to the opposite side of the rectifier 222.

Operation

In operating the duplicating machine just described the electric cord for the machine is first attached to the power line 197. The power switch 206 is then closed so as to place the motor 42 of motor clutch device 40 in operation. Light bulb 218 at the same time is placed in the closed circuit so as soon as power switch 206 is closed light bulb 218 is energized and glows.

At the same time the circuit to the magnetic brake 60 is also energized inasmuch as the relay switch 231a is disposed in the solid line position shown in Fig. 16. Thus though the motor 42 of the motor clutch unit 40 is operating the drum 25 (Fig. 2) remains still and is actually held still by the braking action of the magnetic brake 60. Let it be assumed that the drum 25 is in the master clamp release position shown in Fig. 12 where the master clamp 129 is disposed above the horizontal and shown in solid lines.

The first operation in using the machine is to apply the master sheet 135 to the drum 25. This is done by first depressing the foot pedal 107 (see Fig. 1) which opens the master clamp 129 so that the edge of the master sheet 135 can be inserted between the jaw portion 136 of the master clamp 129 and the seat portion 137. The foot pedal 107 is then released to close the movable clamp member 131. The machine is now in condition for operation.

By applying pressure to the hand operated trip button 98 (Fig. 12) or one of the foot operated trip buttons 70 or 74, the circuit through the clutch relay 225 (see Fig. 16) is closed so as to deenergize the circuit to the magnetic brake 60 (by movement of relay switch 231a to the broken line position shown in Fig. 16) thereby releasing the brake and at the same time the circuit to the magnetic clutch 43 is closed so as to drive the drum 25 from the motor 42. As long as the hand operated trip button 98 or the foot operated trip buttons 70 or 74 are held in depressed position the motor 42 continues to drive the drum 25 (see Fig. 2) through clutch 43.

As previously mentioned the present machine is adapted to accommodate master sheets of different lengths. For purposes of illustration the present embodiment is shown to accommodate master sheets fourteen inches long or seventeen inches long. For copy sheets fourteen inches long it is desired that one complete revolution of the drum 25 commence at the solid line position of the master clamp shown in Fig. 12, whereas for copy sheets seventeen inches long the revolutions of the drum 25 commence from the broken line position illustrated at 129a in Fig. 12. In order to select one or the other stopping position for the drum 25 the selector switch 158 operated by selector arm 160, shown in Fig. 7, is provided.

As previously mentioned the selector arm 160 selects the proper circuit to be controlled by selector switch 158. One of these circuits as shown in Fig. 16 includes switch 148 and the other of said circuits includes switch 153. Thus if the selector lever 160 is set to place switch 148 (see Fig. 16) in the control circuit, then as the drum 25 rotates the cam 139 (see Fig. 14) opens and closes switch 148 in the manner previously described.

It makes no difference at the outset what position the drum 25 assumes because upon depressing the trip button (either trip button 89, 70 or 74) the clutch relay 225 is energized to place the motor 42 into driving relationship with the drum. Thus the drum 25 rotates and even though the trip button just depressed is returned to its open position the relay 225 continues to be energized through the switch 148 until the cam follower 146 (see Fig. 6) enters the valley 141 of cam 139. In this position switch 148 has been opened by virtue of the movement of bell crank lever 142, thereby breaking the circuit to the clutch relay 225 (if trip button 89, 70 or 74 is no longer being depressed) to deenergize the magnetic clutch 43 and simultaneously energize the magnetic brake 60. The drum is thus stopped at this seventeen inch position in response to the operation of switch 148. Upon continued operation of the duplicating machine the drum will stop (when the actuating trip button 89, 70 or 74 is released) only when the drum cycle has been completed; that is, when the cam follower 146 has again entered valley 141 in the cam 139 (see Fig. 14).

Similarly, by moving the selector lever 160 to its other position so as to place the fourteen inch switch 153 in the circuit, the stopping position of the drum 25 will respond to the movement of bell crank lever 143, which in turn responds to the position of cam follower 151 on the peripheral surface of cam 139.

Referring to Fig. 12 copy sheets are fed between feed rollers 29 and 30 which are rotated in a conventional manner so as to move the copy sheets into the bite between platen 27 and the drum 25. The print on the master sheet 135 is then transferred onto the copy sheet as the latter is fed between the platen 27 and the drum 25, and then the copy sheet is transported to a tray or similar receptacle (not shown) on the discharge side of the drum 25.

After the duplicating operation has been completed it may be desirable to remove the master sheet 135 automatically. This can be accomplished in the present device by simply depressing the master ejector button 177 and holding this button down while at the same time depressing one of the trip buttons 89, 70 or 74. By depressing the master ejector button 177 the bell crank lever 164 (Fig. 7) is rotated in a clockwise direction so as to move the central leaf 167 of selector switch 158 to the position closing contacts 168 and 169, thus placing switch 153 (Figs. 14 and 16) in the control circuit. This movement of bell crank lever 182 also raises the arm 187 into position to strike the arm 127 (see Fig. 8) to rotate this latter arm in a counterclockwise direction as viewed in Fig. 8 to cause arm 138 (Figs. 8, 12 and 13) to strike the knob or head 133 of shaft 132 of the master clamp 129. This momentarily opens the master clamp 129 in the position shown in Fig. 13 so as to release the previously clamped edge of the master sheet 135. The movement of bell crank lever 182 previously described also places the stripper 191 (Figs. 12 and 13) in its operative position shown in Fig. 13 so as to strip the master sheet 135 off the face of the drum. Throughout the remainder of the revolution of the drum 25 this master sheet 135 is deposited in the tray or like receptacle on the discharge side of the drum.

I claim:

1. A duplicating machine comprising a drum embodying means for supporting a master sheet and a pair of intermittently rotating sheet feed rolls driven therefrom, non-blocking braking means to cause said drum to come to a stop in either one of two positions, a cam carried on said drum and rotating therewith, two cam followers angularly spaced from each other by a distance corresponding to the angular distance between said two stop positions and engaged by said cam, a pair of normally closed cam switches located peripherally with respect to the drum and each being associated with and actuated by one of said cam followers, electromagnetic means for causing, when deenergized, actuation of said braking means, a power source, said cam switches being connected in parallel with each other and in series circuit with said electromagnetic means and said power source, whereby the opening of either one of said cam switches incident to the rotation of said drum and cam would de-energize said electromagnetic means to actuate said brake, and a selector switch for alternatively cutting one or the other of said cam switches out of said series circuit thereby permitting selection of one or the other of said two positions into which said drum will be caused to come to a stop.

2. A duplicating machine comprising a drum for supporting a master sheet, intermittently rotating feed rolls driven from said drum and serving to position the copy sheets to be fed into engagement with a master sheet secured to said drum, a master clamp provided on said drum for securing a master sheet thereto, driving means for said drum including non-blocking braking means and non-blocking clutch means adapted for alternative operation for causing said drum to come to a stop in a position in which said feed rolls are stationary and for causing said drum to be again placed in motion, respectively, and means for actuating said braking means alternatively at two different points in the drum cycle whereby said drum will come to a stop in a normal position suitable for duplicating on sheets of standard length and in a second position for duplicating on sheets of a length greater than standard length, said means including a cam rotating with said drum, two cam followers mounted about said cam in an angularly spaced position with respect to each other, one of said cam followers being located at a position in advance of said normal stop position by an angular distance corresponding to the distance through which the drum will move between the time said braking means is actuated and the time that said drum comes to rest, and the other of said cam followers being located at a position in advance of said greater length of sheet stop position by a similar angular distance, two cam switches actuated by said cam followers, a selector switch associated with said cam switches, electromagnetic means for actuating said brake actuating means, and a power source, said cam switches being connected in parallel with each other and in series circuit with said power source, said selector switch, and said electromagnetic means whereby said selector switch may be actuated to cause said drum to come to a stop either in said normal position or in said second position.

3. A duplicating machine as claimed in claim 2 having first clamp control means for opening said master clamp when said drum is at rest in said normal position, and having second clamp control means for causing said master clamp to open while said drum is in motion and prior to the time that it reaches said normal position, said second clamp control means including means engaging said selector switch to move the same into that position which will cause said drum to come to rest in said normal position whereby said drum will always come to rest in said normal position subsequent to actuation of said second clamp control means.

4. A duplicating machine comprising a drum embodying means for supporting a master sheet, a pair of intermittently rotating sheet feed rolls driven from said drum, driving means including a clutch winding and a brake winding adapted for alternative energization for starting the drum or for stopping it, a cam rotating with said drum, two cyclically operating normally closed cam switches actuated by said cam for sequential operation, said cam switches being angularly spaced from each other, a power source, a first circuit including said power source, a first selector switch, and said windings, said windings being connected in parallel with each other and in series with said first selector switch, said first selector switch being biased toward said brake winding and away from said clutch winding, a relay coil for actuating, when energized, said first selector switch so as to de-energize said brake winding and to energize said clutch winding, a second circuit including said power source, a second selector switch, said two cam switches, a normally open relay switch operated by said relay coil, and said relay coil, said cam switches being connected in parallel with each other and in series circuit with said power source, said second selector switch, said relay switch, and said relay coil, whereby the circuit through said relay coil will be opened by the opening of one or the other of said cyclically operating cam switches, depending upon the position of said second selector switch, in order that said brake winding may be energized to stop said drum in one or the other of two positions corresponding to the positions represented by the spacing of said cam switches about said cam, and a shunt circuit containing a control switch extending between said relay coil and said power source, and being shunted around said second selector switch, said cam switches and said relay switch, for initially energizing said relay coil and said second circuit and said clutch winding, to initiate the rotation of said drum and cam.

CARL A. LEVIN.

References Cited in the file of this patent

UNITED STATES PATENTS

| Number | Name | Date |
| --- | --- | --- |
| 1,993,413 | Mellon | Mar. 5, 1935 |
| 2,084,317 | Brayer | June 22, 1937 |
| 2,259,574 | Lillquist | Oct. 21, 1941 |
| 2,277,967 | Gibson | Mar. 31, 1942 |
| 2,350,703 | Ryan et al. | June 6, 1944 |
| 2,421,823 | Allen et al. | June 10, 1947 |
| 2,423,028 | Horton et al. | June 24, 1947 |
| 2,471,505 | Winther | May 31, 1949 |
| 2,483,203 | Janke | Sept. 27, 1949 |